(12) United States Patent
Nishiwaki et al.

(10) Patent No.: US 7,443,440 B2
(45) Date of Patent: Oct. 28, 2008

(54) COLOR SEPARATOR AND IMAGER

(75) Inventors: Seiji Nishiwaki, Kobe (JP); Michiyoshi Nagashima, Ikoma (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 745 days.

(21) Appl. No.: 11/092,269

(22) Filed: Mar. 29, 2005

(65) Prior Publication Data

US 2005/0219699 A1      Oct. 6, 2005

(30) Foreign Application Priority Data

Mar. 31, 2004   (JP)   .............................. 2004-103773

(51) Int. Cl.
H04N 13/04   (2006.01)
H04N 9/07    (2006.01)
H04N 5/225   (2006.01)
G02F 1/03    (2006.01)
G02F 1/07    (2006.01)
G02F 1/29    (2006.01)
G02F 1/13    (2006.01)
G02F 1/1335  (2006.01)
G02B 5/18    (2006.01)

(52) U.S. Cl. .................. 348/336; 359/246; 359/251; 359/558; 349/96; 349/100; 349/103; 348/340; 348/342; 348/360

(58) Field of Classification Search ................ 359/251, 359/246, 301; 356/453; 369/112.16; 399/178; 348/336, 60, 55, 58, 360; 358/515; 349/2, 349/96–103

See application file for complete search history.

(56) References Cited

U.S. PATENT DOCUMENTS

| 5,046,061    | A  | * | 9/1991  | Chaya et al.      | 369/112.17 |
| 5,864,364    | A  |   | 1/1999  | Ohyama et al.     |            |
| 5,973,817    | A  | * | 10/1999 | Robinson et al.   | 359/247    |
| 6,108,059    | A  | * | 8/2000  | Yang              | 349/65     |
| 6,130,731    | A  | * | 10/2000 | Andersson et al.  | 349/77     |
| 6,157,419    | A  | * | 12/2000 | Mitsutake         | 349/9      |
| 2002/0051100 | A1 | * | 5/2002  | Kwon et al.       | 349/5      |
| 2003/0147051 | A1 | * | 8/2003  | Fujita et al.     | 353/31     |
| 2003/0156325 | A1 | * | 8/2003  | Hoshi             | 359/486    |
| 2004/0174582 | A1 | * | 9/2004  | Asakura           | 359/246    |
| 2005/0018561 | A1 | * | 1/2005  | Miyake            | 369/44.41  |
| 2005/0218309 | A1 | * | 10/2005 | Nishiwaki et al.  | 250/226    |

* cited by examiner

*Primary Examiner*—Ngoc-Yen T. Vu
*Assistant Examiner*—Michael Osinski
(74) *Attorney, Agent, or Firm*—Renner, Otto, Boisselle & Sklar, LLP

(57) ABSTRACT

A color separator includes a polarization converting section for converting an incoming light ray into a linearly polarized light ray such that the polarization direction of the linearly polarized light ray is selectable from a number of predetermined directions, and a diffracting section, which is arranged so as to receive the linearly polarized light ray that has gone out of the polarization converting section and which produces a zero-order light ray in which one of multiple different wavelength components is selectively weakened according to the polarization direction at least.

18 Claims, 6 Drawing Sheets

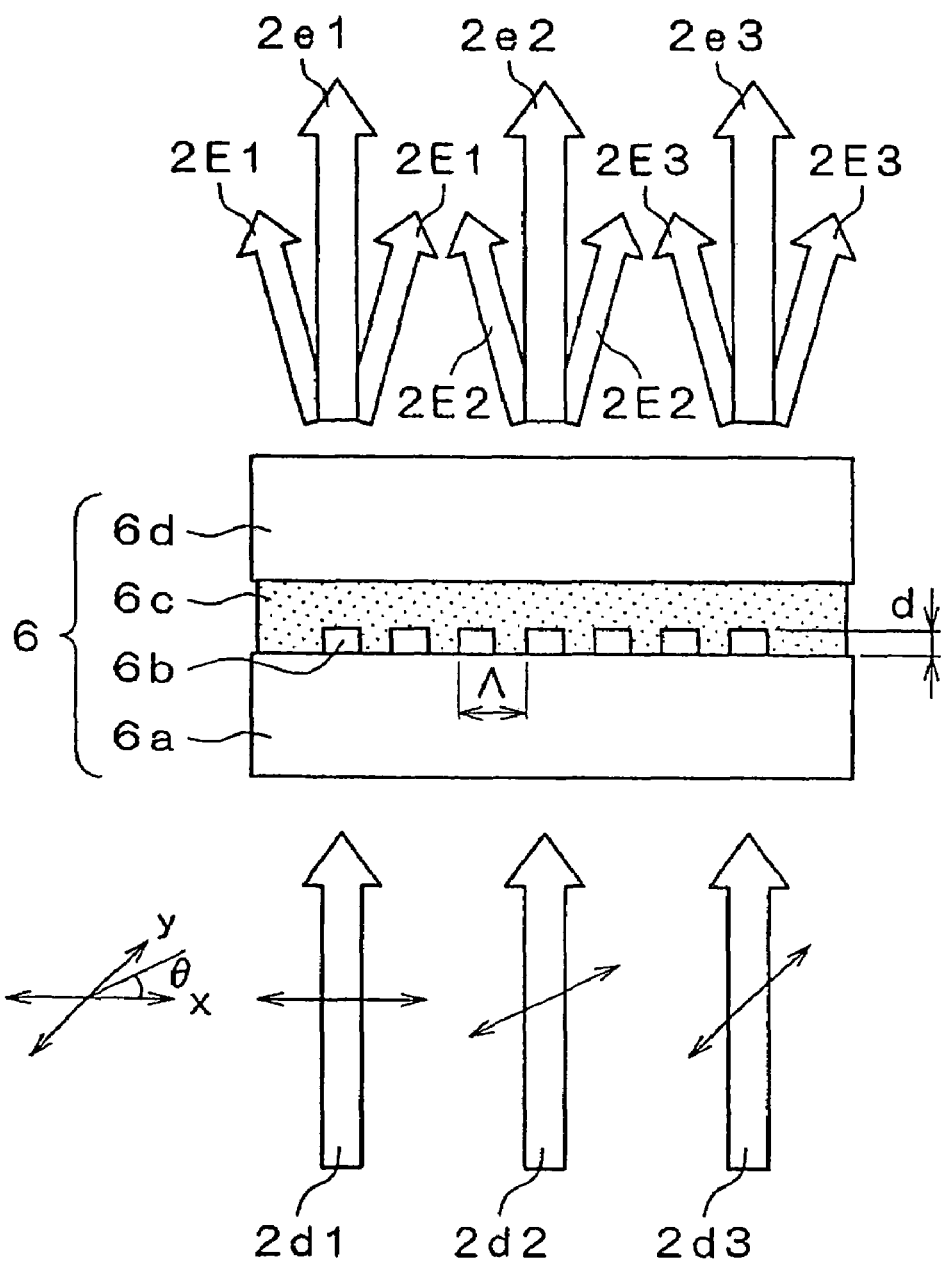

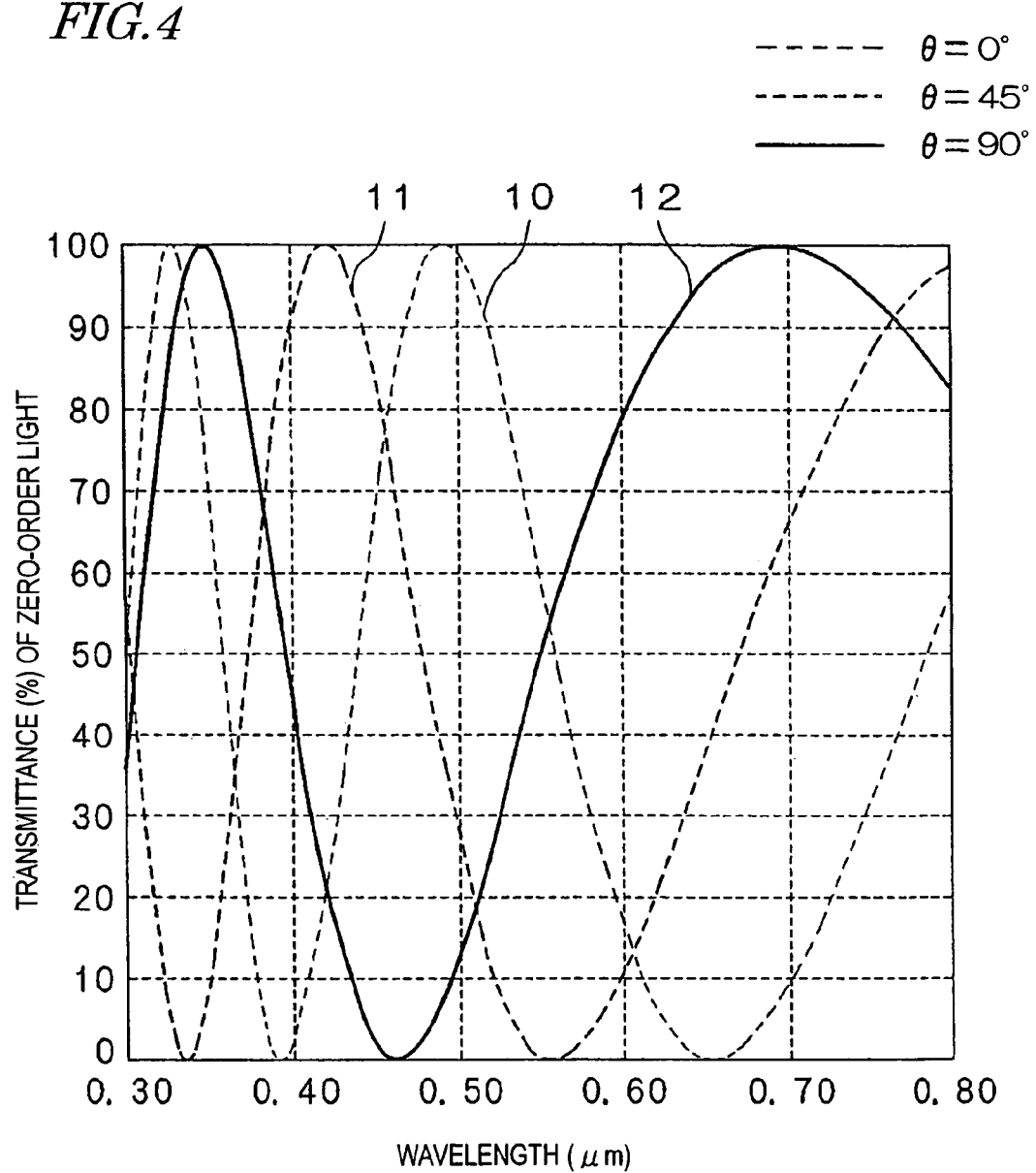

COLOR SEPARATOR AND IMAGER

BACKGROUND OF THE INVENTION

1. Field of the Invention

The present invention relates to a color separator and an imager for use to capture an image or video.

2. Description of the Related Art

Digital still cameras and digital camcorders for acquiring digital video data by capturing an image or video have become more and more popular recently. As methods for capturing a color image or video, a space division technique and a time division technique are known.

According to the space division technique, the given video is spatially decomposed into respective colors using RGB color filters and the intensities of the respective colors are detected in respective pixels, thereby obtaining digital image data. A lot of digital cameras and digital camcorders of today adopt this technique.

On the other hand, according to the time division technique, the given video is temporally decomposed into respective colors during a predetermined period (e.g., a frame period) and the intensities of respective colors are detected in the same pixel, thereby obtaining digital image data. Hereinafter, a conventional imager that adopts this time division technique will be described by reference to Japanese Patent Application Laid-Open Publication No. 9-172649. FIG. 6 schematically illustrates an overall configuration for the conventional imager. Natural light or any other type of light is incident on an object 1, reflected from the object 1, transmitted through a color separating plate 13, and then imaged by a lens system 7, thereby producing an image 9 on the photodetector 8 of a CCD or a CMOS device. To achieve required optical performance with the lens system 7, a number of lenses are usually arranged along the optical axis. In FIG. 6, however, only one lens is illustrated for the sake of simplicity. The color separating plate 13 is obtained by dividing a transparent disk into four areas with four lines 13a, 13b, 13a and 13d extending radially from its center O and by providing color filters for the respective areas 13R, 13G, 13G' and 13B. Specifically, a filter transmitting a red ray only is provided for the area 13R, filters transmitting a green ray only are provided for the areas 13G and 13G' and a filter transmitting only a blue ray is provided for the area 13B.

The color separating plate 13 is secured to a motor so as to rotate around the axis L that passes the center O as pointed by the arrow 15 in FIG. 6. Accordingly, the image 9 produced on the photodetector 8 changes its colors in the order of red, green, blue and green time-sequentially.

The photodetector 8 detects these color rays and sends out signals representing those colors to an external computing unit. The computing unit calculates those colors as a set of signals representing red, green and blue and also calculates the brightness as a signal representing green. In this manner, a color image is reproduced.

According to this time division technique, there is no need to provide color filters for respective pixels. In addition, since the three primary colors of R, G and B can be all detected in a single pixel, the pixel pitch can be narrowed and a video with high resolution can be obtained.

In the imager disclosed in Japanese Patent Application Laid-Open Publication No. 9-172649, however, the color separating plate 13 should rotate around the axis L, which is arranged outside of the optical path of the lens system 7 so as to avoid interference with the lens system 7. Thus, the overall size of the imager increases.

In addition, while the color separating plate 13 is rotating, there is a period in which the division line 13a, 13b, 13a or 13d splits the cross section BS of the optical path 2 of the lens system 7 into two on the color separating plate 13. During such a period, the image 9 produced on the photodetector 8 is presented in two colors and the boundary between the colors shifts, too. The photodetector 8 cannot acquire normal data during that period and needs to perform its detection while none of the division lines 13a, 13b, 13c and 13d is splitting the cross section BS, thus decreasing the optical efficiency.

The optical efficiency is proportional to R/r, where R is the distance from the center O of rotation to the center S of the cross section BS and r is the radius of the cross-sectional area BS. However, when a lens system is adopted, the magnitude of r is determined automatically. That is why the optical efficiency is proportional to the magnitude of R. Consequently, to increase the optical efficiency, the color separating plate 13 needs to have an increased size, thus making it difficult to reduce the size of the imager.

SUMMARY OF THE INVENTION

In order to overcome the problems described above, preferred embodiments of the present invention provide a color separator and an imager of reduced sizes.

A color separator according to a preferred embodiment of the present invention preferably includes: a polarization converting section for converting an incoming light ray into a linearly polarized light ray such that the polarization direction of the linearly polarized light ray is selectable from a number of predetermined directions; and a diffracting section, which is arranged so as to receive the linearly polarized light ray that has gone out of the polarization converting section and which produces a zero-order light ray in which one of multiple different wavelength components is selectively weakened according to the polarization direction at least.

In one preferred embodiment of the present invention, the color separator preferably further includes a driving section for driving the polarization converting section such that the polarization direction selected by the polarization converting section changes from one of the predetermined directions into another at regular intervals.

In another preferred embodiment, the number of the predetermined directions is preferably at least three.

In this particular preferred embodiment, the polarization directions are defined by 0, 45 and 90 degrees on the wave front of the linearly polarized light ray that has just been transmitted through the polarization converting section.

In a specific preferred embodiment, the diffracting section preferably includes: a diffraction grating with periodic unevenness, which is defined by a plurality of raised portions and a plurality of recessed portions; and a transparent medium with birefringence, which is provided so as to fill the recessed portions of the diffraction grating.

More particularly, a phase difference, which is produced between a light ray transmitted through one of the recessed portions of the diffraction grating and a light ray transmitted through associated one of the raised portions of the diffraction grating, preferably corresponds to at least one wavelength of a blue light ray.

In a specific preferred embodiment, the phase difference produced between the light rays transmitted through the recessed and raised portions of the diffraction grating preferably corresponds to 1.5 wavelengths of a red light ray with a polarization direction of 0 degrees and to 1.5 wavelengths of a blue light ray with a polarization direction of 90 degrees.

In another preferred embodiment, the polarization converting section preferably includes a polarization filter, a liquid crystal cell, and a quarter-wave plate. The polarization filter preferably converts the incoming light ray into a linearly P-polarized ray. The liquid crystal cell preferably selectively converts the incoming linearly P-polarized ray into one of the linearly P-polarized ray, a circularly polarized ray and a linearly S-polarized ray at least. And the quarter-wave plate preferably has a fast-axis direction that matches the polarization direction of the P- or S-polarized ray.

In this particular preferred embodiment, the driving section preferably applies a voltage to the liquid crystal cell such that liquid crystal molecules included in the liquid crystal cell change their orientation states, thereby converting the linearly P-polarized ray according to the voltage applied.

An imager according to a preferred embodiment of the present invention preferably includes: the color separator according to any of the preferred embodiments of the present invention described above; a focusing section for selectively focusing only the zero-order light ray, which has gone out of the diffracting section of the color separator, onto a photodetector section; and the photodetector section for detecting the zero-order light ray and generating a detection signal when the polarization direction changes in the polarization converting section of the color separator.

In one preferred embodiment of the present invention, the frame of the photodetector section and the focal length of the focusing section are preferably defined such that a first- or higher-order diffracted light ray, which has gone out of the diffracting section of the color separator, is not focused by the focusing section onto the photodetector section.

In another preferred embodiment, the photodetector section preferably includes a plurality of photosensing elements, which are arranged two-dimensionally.

An incoming ray color separating method according to a preferred embodiment of the present invention preferably includes the steps of: (a) converting an incoming light ray into a linearly polarized light ray such that the polarization direction of the linearly polarized light ray changes from one of predetermined directions into another at regular intervals; and (b) diffracting the linearly polarized light ray, thereby producing a zero-order light ray in which one of multiple different wavelength components is selectively weakened according to the polarization direction at least.

In one preferred embodiment of the present invention, the step (a) preferably includes the step of changing the polarization directions of the linearly polarized light ray from one of 0 degrees, 45 degrees and 90 degrees into another at the regular intervals.

In another preferred embodiment, the step (b) includes the step of producing zero-order light rays in which red, blue and green wavelength components are selectively weakened according to the polarization direction of 0 degrees, 45 degrees and 90 degrees, respectively.

A video capturing method according to a preferred embodiment of the present invention preferably includes the steps of: (a) converting an incoming light ray into a linearly polarized light ray such that the polarization direction of the linearly polarized light ray changes from one of predetermined directions into another at regular intervals; (b) diffracting the linearly polarized light ray, thereby producing a zero-order light ray in which one of multiple different wavelength components is selectively weakened according to the polarization direction at least; and (c) detecting the zero-order light ray two-dimensionally at the intervals at which the directions change in the step (a).

In one preferred embodiment of the present invention, the step (a) preferably includes the step of changing the polarization directions of the linearly polarized light ray from one of 0 degrees, 45 degrees and 90 degrees into another at the regular intervals.

In another preferred embodiment, the step (b) includes the step of producing zero-order light rays in which red, blue and green wavelength components are selectively weakened according to the polarization direction of 0 degrees, 45 degrees and 90 degrees, respectively.

According to a preferred embodiment of the present invention, a polarization converting section produces a linearly polarized light ray, of which the polarization direction changes from one of a number of predetermined directions into another at regular intervals, and a diffracting section can produce a zero-order light ray, in which multiple different wavelength components are weakened in the polarization direction, from the linearly polarized light ray. Thus, a color separator, which can separate colors by the time division technique without using the color separating plate, can be obtained. This color separator includes no color separating plate and can arrange the polarization converting section and the diffracting section coaxially on the optical path of the imager in the optical system. As a result, the size of the imager can be reduced significantly.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 3 illustrates the structure and operating principle of the diffracting section of the color separator shown in FIG. 1.

FIG. 4 shows relationships between the transmittance and wavelength of the zero-order light ray that has gone out of the diffracting section.

DETAILED DESCRIPTION OF PREFERRED EMBODIMENTS

Hereinafter, a color separator and an image according to preferred embodiments of the present invention will be described with reference to the accompanying drawings.

Figure 1:
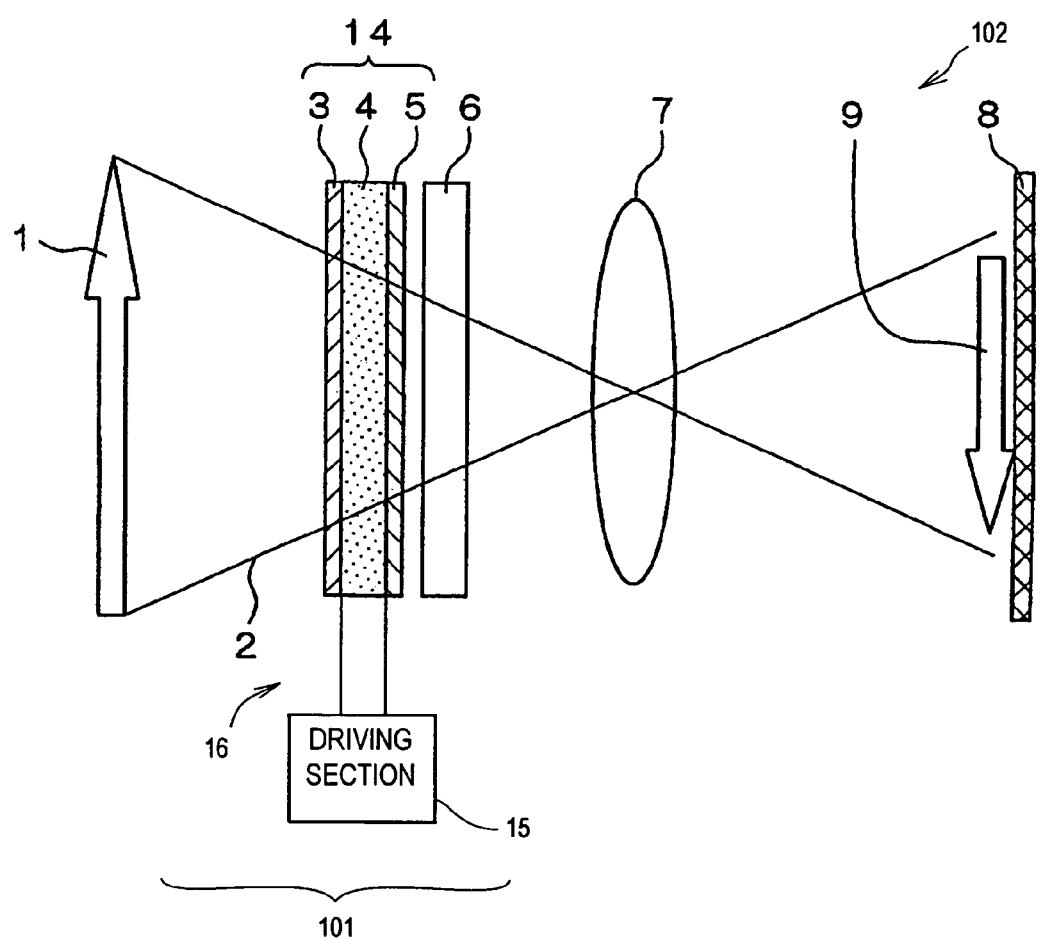
FIG. 1 schematically illustrates an arrangement for an imager including a color separator according to a preferred embodiment of the present invention.

FIG. 1 schematically illustrates an arrangement for an imager 102 including a color separator 101. The imager 102 preferably includes the color separator 101, a lens system 7 as a focusing section and a photodetector section 8. Natural light or any other type of light 2 is incident on an object 1, reflected from the object 1 and then subjected to color separation by the color separator 101 by the time division technique. As a result, color rays that have been separated in a predetermined order and at regular intervals are focused by the lens system 7, thereby producing an image of the object 1 on the sensing plane of the photodetector section 8. In FIG. 1, the lens system 7 is illustrated as a single convex lens. Actually, however, the lens system 7 is preferably a combination of a number of lenses, which are arranged so as to have their optical axes aligned with each other.

The photodetector section 8 is preferably a CCD image sensor or a CMOS image sensor including a two-dimensional array of sensing elements. For example, a monochrome CCD image sensor or CMOS image sensor may be used.

The color separator 101 preferably includes a polarization direction changer 16 and a diffracting section 6. The polarization direction changer 16 preferably includes a polarization converting section 14 and a driving section 15. The polarization direction changer 16 receives the light 2 reflected from the object 1 as an incoming light ray and converts the incoming light ray into a linearly polarized light ray, of which the polarization direction changes into one of predetermined directions after another at regular intervals. The diffracting section 6 is preferably arranged so as to receive the linearly polarized light ray that has gone out of the polarization direction changer 16. The diffracting section 6 preferably diffracts the incoming linearly polarized light ray, thereby producing a zero-order light ray, a first-order light ray and other higher-order light rays. Among these light rays, in the zero-order light ray, multiple different wavelength components are weakened according to the polarization direction of the incoming light ray. Since the polarization direction of the light ray entering the diffracting section 6 changes at regular intervals, the wavelength components weakened in the zero-order light ray produced by the diffracting section 6 change at the regular intervals. That is to say, the color of the zero-order light ray changes into a complementary color associated with the periodically weakened wavelength components with the passage of time.

As will be described in detail later, the polarization direction changer 16 may convert the incoming light ray into linearly polarized light rays with three different directions, and the diffracting section 6 may output a zero-order light ray, in which the wavelength components of red, green or blue are weakened according to the polarization direction of the incoming linearly polarized light ray. Thus, the diffracting section 6 may output a zero-order light ray, of which the color changes into one of cyan, magenta and yellow (i.e., the complementary colors of red, green and blue, respectively) after another at regular intervals. The photodetector section 8 detects these colors, sends out signals representing those colors to an external computing unit, and calculates the colors and brightness, thereby reproducing a color image.

Next, the operating principles of the respective sections will be described in detail. In the polarization direction changer 16, the polarization converting section 14 preferably includes a polarization filter 3, a liquid crystal cell 4 and a quarter-wave plate 5. In the polarization converting section 14, the liquid crystal cell 4 is preferably sandwiched between the polarization filter 3 and the quarter-wave plate 5 and the polarization filter 3, liquid crystal cell 4 and quarter-wave plate 5 are preferably arranged such that the incoming light ray 2 transmits the polarization filter 3 first.

Figure 2:
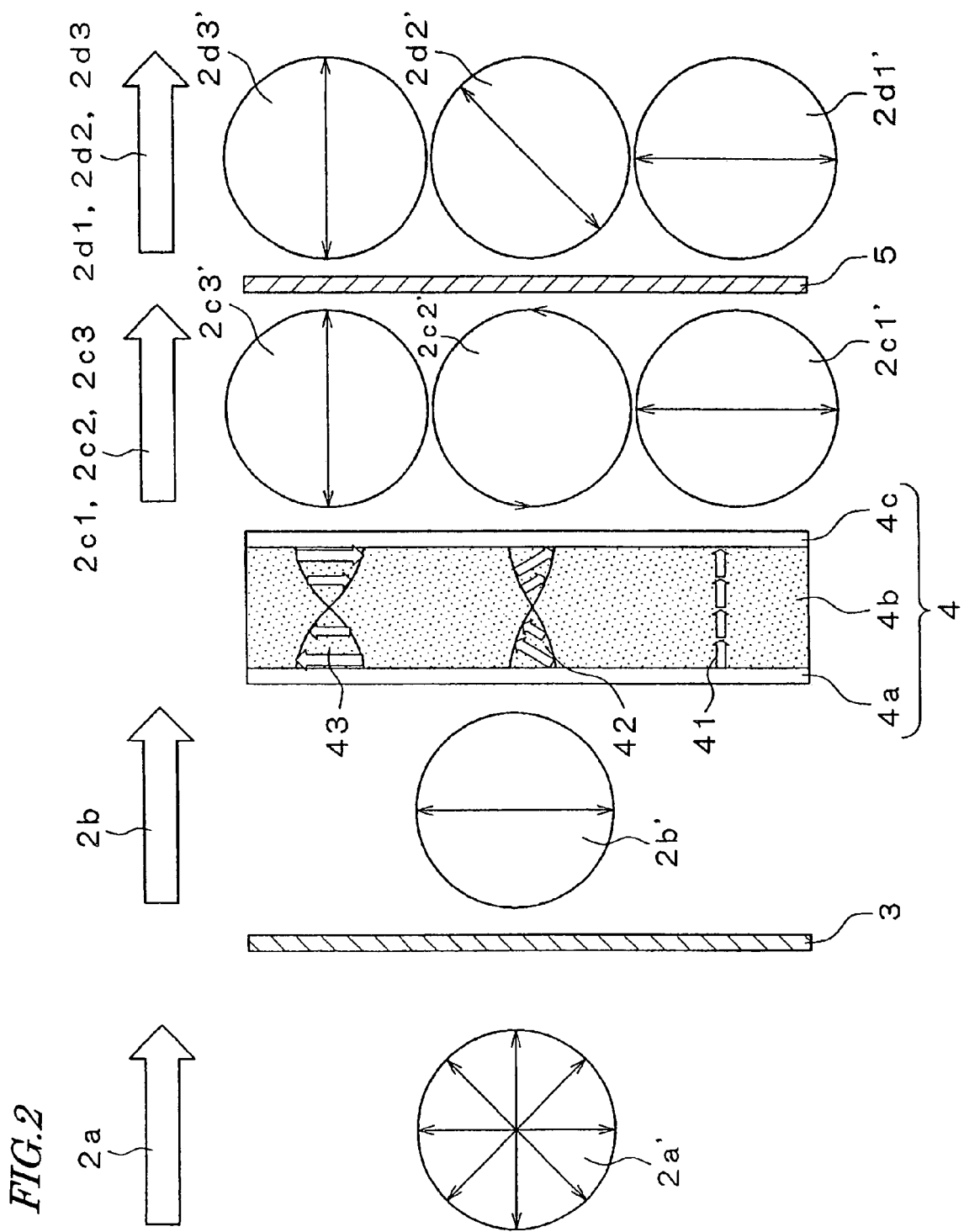
FIG. 2 illustrates the structure and operating principle of the polarization converting section of the color separator shown in FIG. 1.

FIG. 2 schematically illustrates a detailed structure of the polarization converting section 14. The light 2 reflected from the object 1 is white natural light and has random polarization directions. When the white light ray 2a with random polarization directions 2a' passes the polarization filter 3, the white light ray 2a changes into a white light ray 2b of which the polarization direction 2b' is parallel to the polarization axis of the polarization filter 3.

The liquid crystal cell 4 preferably includes a pair of transparent substrates 4a and 4c and a liquid crystal layer 4b interposed between the substrates 4a and 4c. On the opposed principal surfaces of the transparent substrates 4a and 4c, transparent electrodes of ITO, for example, are preferably provided and electrically connected to the driving section 15 (see FIG. 1). The surface of the transparent electrodes is preferably coated with an alignment film, which is preferably subjected to a rubbing treatment so as to align the orientation directions of liquid crystal molecules in the liquid crystal layer 4b with the rubbing direction while no voltage is being applied thereto. The liquid crystal layer 4b may be a STN (Super Twisted Nematic) type liquid crystal layer, for example.

In response to the voltage being applied between the transparent substrate 4a and 4c, the liquid crystal layer 4b preferably changes the tilt angle of the liquid crystal molecules, thereby controlling the optical rotatory power and the birefringence thereof. In this manner, the polarization state of the linearly polarized light ray that has entered the liquid crystal cell 4 is changed. For example, while no voltage is being applied to the liquid crystal layer 4b, the liquid crystal molecules are twisted in the thickness direction of the liquid crystal layer 4b. On the other hand, when a voltage is applied between the transparent electrodes, the liquid crystal molecules rise in the thickness direction of the liquid crystal layer 4b so as to be aligned vertically toward the transparent substrates 4a and 4c. The liquid crystal cell 4 changes the polarization states of the transmitted light according to the alignment direction of the liquid crystal layer 4b.

If the voltage applied by the driving section 15 (see FIG. 1) is high, then the major axis of the liquid crystal molecules is aligned with the direction of the electric field. As a result, the liquid crystal molecules are aligned in the thickness direction as pointed by the arrows 41 in FIG. 2. Consequently, the optical rotatory power of the liquid crystal layer 4b is lost, and the incoming linearly polarized light ray 2b with the polarization direction 2b' is transmitted through the liquid crystal layer 4b as it is, i.e., as a linearly polarized light ray 2c1 with the polarization direction 2c1'. Meanwhile, if no voltage is being applied, then the liquid crystal molecules are twisted as pointed by the arrows 43 in FIG. 2. Thus, the incoming linearly polarized light ray 2b with the polarization direction 2b' is converted into a linearly polarized light ray 2c3 with the polarization direction 2c3' that has rotated 90 (270) degrees from the original polarization direction 2b'. And if an intermediate voltage is applied from the driving section 15 to between the transparent electrodes, then the liquid crystal molecules are twisted as pointed by the arrows 42 in FIG. 2 and the incoming linearly polarized light ray 2b with the polarization direction 2b' is converted into a circularly polarized light ray 2c2 with the polarization direction 2c2'.

These light rays 2c1, 2c2 and 2c3 with the three polarization directions 2c1', 2c2' and 2c3' are transmitted through the quarter-wave plate 5, which is arranged such that the fast-axis direction thereof matches the polarization direction 2c1' or 2c3', to be converted into linearly polarized light rays 2d1, 2d2 and 2d3 with polarization directions 2d1', 2d2' and 2d3', respectively. The polarization directions 2d1' and 2d3' are the same as the polarization directions 2c1' and 2c3', respectively. On the other hand, the circularly polarized light ray 2c2 is converted into a linearly polarized light ray 2d2 with a polarization direction 2d2' of 45 degrees (or 135 degrees). In this manner, the light ray 2a that has entered the polarization converting section 14 with the random polarization directions 2a' can be converted into three different types of linearly polarized light rays, of which the polarization directions are changeable with the magnitude and timing of the voltage being applied to the liquid crystal layer 4b.

The response time of the liquid crystal layer 4b among the states 41, 42 and 43 is preferably on the order of several tens of ms, more preferably about 10 ms. In that case, it takes a time of about 30 ms to make a round of these three polarization states.

FIG. 3 schematically illustrates the structure of the diffracting section 6. The diffracting section 6 preferably includes a diffraction grating 6b and a birefringent medium 6c between two transparent substrates 6a and 6d. The diffraction grating 6b preferably includes a plurality of transparent striped raised portions made of $TiO_2$, $Ta_2O_3$, SiN or any other suitable material. The raised portions may have a height of d μm and may be arranged on the transparent substrate 6a at a duty ratio of 50% and at a pitch of Λ. A recessed portion is provided between two raised portions such that the diffraction grating 6b has an uneven surface. The birefringent medium 6c is provided between the transparent substrates 6a and 6d so as to fill the recessed portions of the diffraction grating 6b. The birefringent medium 6c may be a UV curable liquid crystal material, for example.

The diffracting section 6 may be formed by performing known thin film deposition and photolithographic processes. For example, a film of $TiO_2$, $Ta_2O_3$, SiN or any other suitable material may be deposited all over the transparent substrate 6a and then subjected to a predetermined patterning process, thereby defining the diffraction grating 6b on the transparent substrate 6a. Thereafter, a UV curable liquid crystal material may be applied over the diffraction grating 6b and then exposed to and cured by an ultraviolet ray, thereby providing the birefringent medium 6c. And then the transparent substrate 6d may be put on the birefringent medium 6a to obtain the diffracting section 6.

As shown in FIG. 3, the birefringent medium 6c has a refractive index nx in the x-axis direction (i.e., the direction parallel to the paper) and a refractive index ny in the y-axis direction (i.e., the direction coming out of the paper), respectively. The diffraction grating 6b has a refractive index n0 in the raised portions thereof. Accordingly, the phase difference of the transmitted light between the raised and recessed portions of the diffraction grating 6b becomes (n0−nx)×d with respect to the linearly polarized light ray 2d1, of which the polarization direction is the x-axis direction (with an azimuth θ of 0 degrees), and (n0−ny)×d with respect to the linearly polarized light ray 2d3, of which the polarization direction is the y-axis direction (with an azimuth θ of 90 degrees), respectively. Also, the phase difference is given by {n0−(nx+ny)/2}×d with respect to the linearly polarized light ray 2d2, of which the polarization direction has an azimuth θ of 45 degrees.

For example, supposing n0=2.35, nx=1.50, ny=1.75 and d=1.15 μm, then the phase difference of the light ray 2d1 (with an azimuth θ of 0 degrees) is 0.98 μm, the phase difference of the light ray 2d2 (with an azimuth θ of 45 degrees) is 0.835 μm, and the phase difference of the light ray 2d3 (with an azimuth θ of 90 degrees) is 0.69 μm.

In this case, the phase difference of 0.98 μm is 1.5 times as long as the wavelength of a red ray, the phase difference of 0.69 μm is 1.5 times as long as the wavelength of a blue ray, and the phase difference of 0.835 μm is 1.5 times as long as the wavelength of a green ray. That is to say, a phase difference that is 3/2 times as long as the wavelength of a red, green or blue ray is caused with respect to the wavelength of the red, green or blue ray. Accordingly, when the light rays 2d1, 2d2 and 2d3 are transmitted through the diffracting section 6, the wavelength components of a red ray (with a wavelength of 0.653 μm), a blue ray (with a wavelength of 0.460 μm) and a green ray (with a wavelength of 0.557 μm) are weakened by interference in the zero-order light ray going out of the diffraction grating 6b vertically.

FIG. 4 shows relationships between the transmittance and wavelength of the zero-order light ray under the conditions described above. In the light ray with the azimuth θ of 0 degrees, the red component thereof is diffracted greatly by the diffracting section 6. That is why the resultant zero-order light ray has weakened red wavelength component and has a transmittance distribution as represented by the curve 10. This transmittance distribution shows light in cyan, which is the complementary color of red. In the same way, in the light ray with the azimuth θ of 90 degrees, the blue component thereof is diffracted greatly by the diffracting section 6. That is why the resultant zero-order light ray has weakened blue wavelength component and has a transmittance distribution as represented by the curve 12. This transmittance distribution shows light in yellow, which is the complementary color of blue. In the light ray with the azimuth θ of 45 degrees, the green component thereof is diffracted greatly by the diffracting section 6. That is why the resultant zero-order light ray has weakened green wavelength component and has a transmittance distribution as represented by the curve 11. This transmittance distribution shows light in magenta.

The three linearly polarized light rays 2d1, 2d2 and 2d3 converted by the polarization converting section 16 have polarization directions 2d1', 2d2' and 2d3' with azimuths θ of 0 degrees, 45 degrees and 90 degrees, respectively. Accordingly, by getting these light rays 2d1, 2d2 and 2d3 transmitted through the diffracting section 6, first- or higher-order diffracted red, green and blue rays 2E1, 2E2 and 2E3 are produced. As a result, only cyan, magenta and yellow rays 2e1, 2e2 and 2e3 are left as zero-order light rays. The polarization converting section 16 changes the polarization directions of white light from one of 0 degrees, 45 degrees and 90 degrees into another at regular intervals as described above. Consequently, the outgoing light ray of the diffracting section 6 changes from one of cyan, magenta and yellow rays into another at the regular intervals. That is to say, the color separator 101 separates the white light into cyan, magenta and yellow rays by a time division technique.

It should be noted that the three types of color rays obtained in this preferred embodiment are complementary color rays. On the other hand, the red, green and blue separated rays obtained in Japanese Patent Application Laid-Open Publication No. 9-172649 are primary color rays. The complementary color rays have twice higher energy than the primary color rays. Accordingly, even if approximately half of the incoming light is cut off by the polarization filter 3 to decrease the energy of the light significantly, the decrease in energy can also be compensated for by using the complementary color rays.

In designing the imager 102 including the color separator 101 with such a structure, only the zero-order light ray, which has gone out of the color separator 101, needs to be selectively focused onto the photodetector section 8. In other words, the first- or higher-order diffracted light should not be detected by the photodetector section 8. Supposing the distance between the center of the image 9' of an object formed by focusing the first-order diffracted light and that of the image 9 of the object formed by focusing the zero-order diffracted light is L and the width (i.e., the frame size) of the photodetector section 8 is w shown in FIG. 5A, L>w is preferably satisfied. In that case, the first-order diffracted light will not enter the photodetector section 8 but only the zero-order diffracted light ray can be selectively focused on the photodetector section 8. Accordingly, supposing f is the focal length of the lens system 7 and θ is the diffraction angle of the first-order light ray (i.e., the angle formed between the zero-order and first-order light rays), $$L = f \tan\theta > w \tag{1}$$

needs to be satisfied.

On the other hand, supposing λ is the wavelength of the light ray that has been transmitted through the diffracting section 6 and then focused on the photodetector section 8 and Λ is the pitch of the diffraction grating 6b, the first-order diffracted light preferably satisfies the following equation:

$$\sin\theta = \lambda/\Lambda \tag{2}$$

If θ is sufficiently small, then $\sin\theta \approx \tan\theta$. In that case, the condition (1) may be rewritten with the equation (2) as follows:

$$(f\lambda)/\Lambda > w \tag{3}$$

That is to say, the width w of the photodetector section 8 needs to be defined so as to satisfy this inequality (3). If the minimum wavelength of the light is 0.4 μm, f=5 mm and w=2 mm, then Λ needs to be 1 μm or less to satisfy the inequality (3). According to photolithographic and fine line patterning techniques currently available, it is not difficult to make the diffraction grating 6b at a pitch Λ of about 1 μm.

Figure 5A:
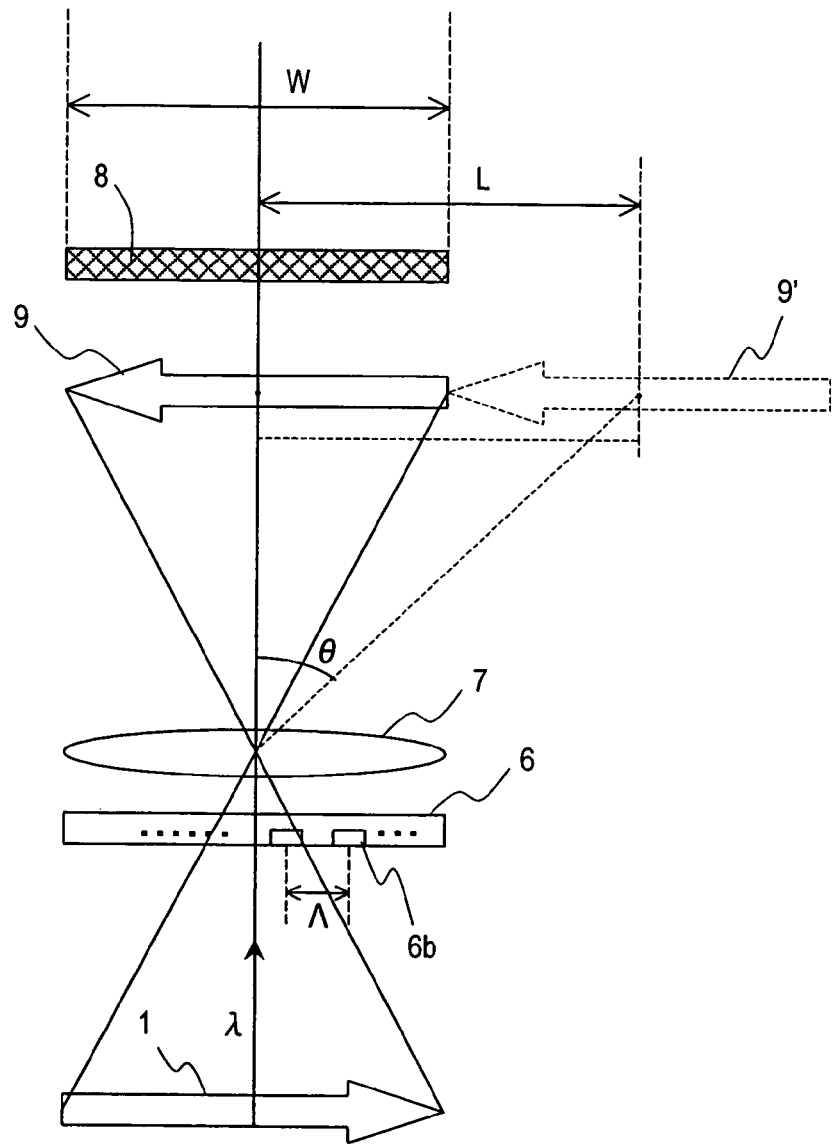
FIG. 5A shows a relationship between the diffraction grating of the diffracting section and the width of the photodetector section in the imager shown in FIG. 1.
Figure 5B:
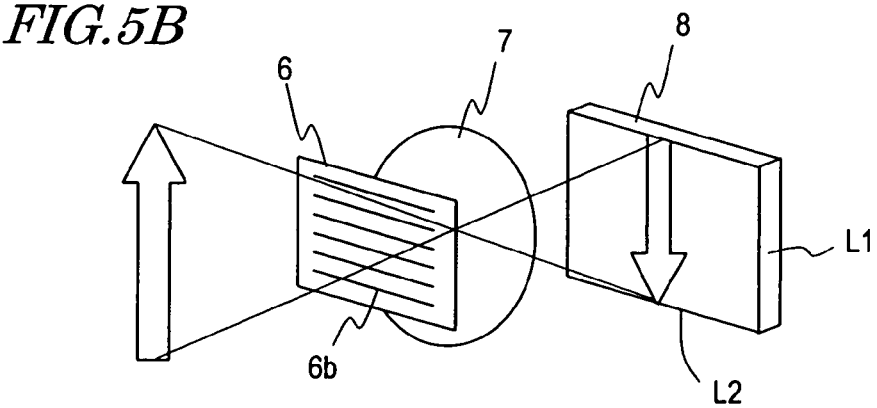
FIG. 5B shows the grating direction of the diffraction grating with respect to the photodetector section.
Figure 6:
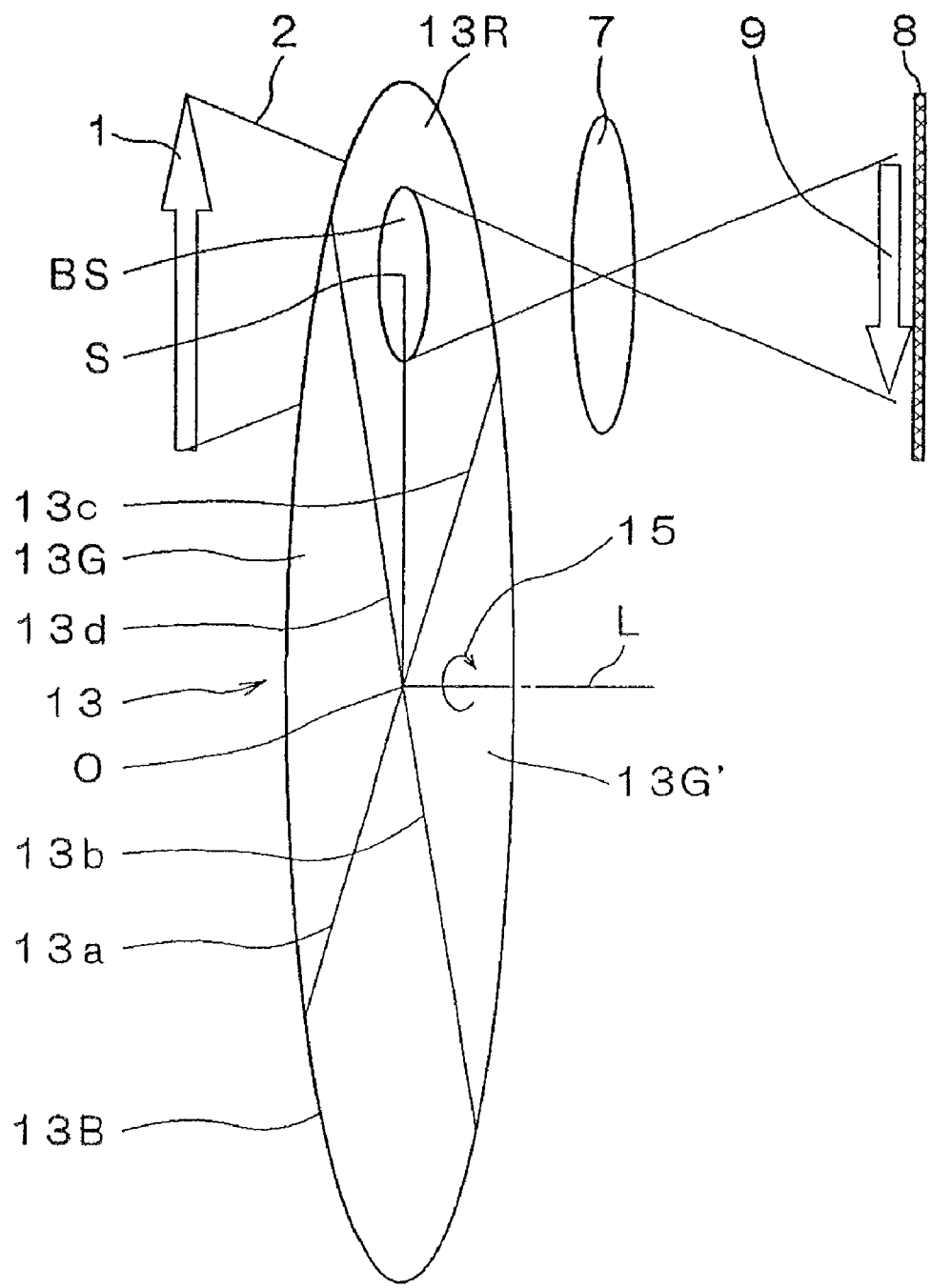
FIG. 6 schematically illustrates an overall arrangement for a conventional imager.

As can be easily seen from FIG. 5A, L is preferably as small as possible to prevent the first- or higher-order light ray from entering the photodetector section 8. Accordingly, unless the frame of the photodetector section 8 is square, the direction of the diffraction produced by the diffracting section 6 is preferably parallel to the shorter sides of the frame of the photodetector section 8. That is to say, the light is preferably diffracted along the shorter sides of the frame. For that reason, if the shorter and longer sides of the photodetector section 8 are identified by L1 and L2, respectively, then the diffraction grating 6b of the diffracting section 6 is preferably arranged so as to be parallel to the longer sides L2 as shown in FIG. 5B.

In this color separator 101, the polarization direction changer 16 preferably converts the incoming light ray into a linearly polarized light ray, of which the polarization direction changes into one of predetermined directions after another at regular intervals as described above. Also, the diffracting section 6 preferably produces a complementary color according to the polarization direction. Thus, when the polarization direction changes in the polarization direction changer 16, the photodetector section 8 preferably detects the zero-order light ray that has gone out of the diffracting section 6b of the color separator 101. More particularly, synchronously with the variation in the drive voltage generated by the driving section 15 of the polarization direction changer 16, the photodetector section 8 preferably detects the complementary color ray that has gone out of the color separator 101.

In the color separator of the preferred embodiment described above, the polarization converting section and the diffracting section include no rotational drive mechanism and can be arranged coaxially with the lens system. Thus, the imager including such a color separator can have a reduced size more easily than a conventional one. Also, in the conventional arrangement such as that disclosed in Japanese Patent Application Laid-Open Publication No. 9-172649, the amount of each color ray received cannot be adjusted without changing any piece of hardware (e.g., changing the division lines of the color separating plate). In the color separator according to the preferred embodiment of the present invention, however, the amount of each color ray received can be adjusted just by changing the waveform of the drive voltage generated by the driving section for driving the polarization converting section. As a result, the color or brightness control or correction can be easily made on the imager with high precision. In addition, unlike the conventional arrangement, there is no need to provide a filter by dividing each pixel of the photodetector. Consequently, the pixel size can be reduced and the number of pixels can be easily increased without changing the frame size.

In the preferred embodiments described above, the liquid crystal layer is supposed to be made of an STN liquid crystal material. However, the liquid crystal layer may also be made of a twisted nematic (TN) liquid crystal material or any other suitable liquid crystal material as long as a P- or S-polarized ray can be converted into a circularly polarized ray. Also, the polarization converting section does not have to be the combination of the polarization filter, liquid crystal cell and quarter-wave plate in the preferred embodiment described above but may also be a structure in which combination of a polarization filter and a half-wave plate is rotated around an optical axis.

Furthermore, in the preferred embodiment described above, the phase difference between a light ray transmitted through a recessed portion of the diffraction grating in the diffracting section and a light ray transmitted through an associated raised portion thereof is supposed to be 1.5 times as long as the wavelength of a red ray when the light ray is polarized in the x-axis direction and 1.5 times as long as the wavelength of a blue ray when the light ray is polarized in the y-axis direction, respectively. Alternatively, any other phase difference may be produced as long as the phase difference between the transmitted light rays is at least equal to a single wavelength of a blue ray. Optionally, even if the color separator is designed so as to weaken the wavelength components of red, green and blue rays at different wavelengths from their own wavelengths, color separation is also realized similarly even though the colors of the zero-order light ray change.

The pattern of the diffraction grating may be defined by etching birefringent crystals of $LiNbO_3$, for example. And the diffracting section may be formed by filling the recessed portions, defined by the etching process, with a birefringent medium such as a UV curable liquid crystal material.

A color separator and an imager according to any of various preferred embodiments of the present invention described above can be used effectively in digital still cameras, digital camcorders, cell phones with camera and other small and thin imagers.

This application is based on Japanese Patent Applications No. 2004-103773 filed on Mar. 31, 2004 and No. 2005-088627 filed on Mar. 25, 2005, the entire contents of which are hereby incorporated by reference.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A color separator comprising:
   a polarization converting section for converting an incoming light ray into a linearly polarized light ray such that the polarization direction of the linearly polarized light ray is selectable from a number of predetermined directions; and
   a diffracting section, which is arranged so as to receive the linearly polarized light ray that has gone out of the polarization converting section and which produces a zero-order light ray in which one of multiple different wavelength components is selectively weakened according to the polarization direction at least.

2. The color separator of claim 1, further comprising a driving section for driving the polarization converting section such that the polarization direction selected by the polarization converting section changes from one of the predetermined directions into others at regular intervals.

3. The color separator of claim 1, wherein the number of the predetermined directions is at least three.

4. The color separator of claim 3, wherein the polarization directions are defined by 0, 45 and 90 degrees on the wave front of the linearly polarized light ray that has just been transmitted through the polarization converting section.

5. The color separator of claim 4, wherein the diffracting section includes: a diffraction grating with periodic unevenness, which is defined by a plurality of raised portions and a plurality of recessed portions; and a transparent medium with birefringence, which is provided so as to fill the recessed portions of the diffraction grating.

6. The color separator of claim 5, wherein a phase difference, which is produced between a light ray transmitted through one of the recessed portions of the diffraction grating and a light ray transmitted through associated one of the raised portions of the diffraction grating, corresponds to at least one wavelength of a blue light ray.

7. The color separator of claim 6, wherein the phase difference produced between the light rays transmitted through the recessed and raised portions of the diffraction grating corresponds to 1.5 wavelengths of a red light ray with a polarization direction of 0 degrees and to 1.5 wavelengths of a blue light ray with a polarization direction of 90 degrees.

8. The color separator of claim 2, wherein the polarization converting section includes:
a polarization filter converting the incoming light ray into a linearly P-polarized ray,
a liquid crystal cell selectively converting the incoming linearly P-polarized ray into one of the linearly P-polarized ray, a circularly polarized ray and a linearly S-polarized ray at least, and
a quarter-wave plate having a fast-axis direction that matches the polarization direction of the P- or S-polarized ray.

9. The color separator of claim 8, wherein the driving section applies a voltage to the liquid crystal cell such that liquid crystal molecules included in the liquid crystal cell change their orientation states, thereby converting the linearly P-polarized ray according to the voltage applied.

10. An imager comprising:
the color separator of claim 1;
a focusing section for selectively focusing only the zero-order light ray, which has gone out of the diffracting section of the color separator, onto a photodetector section; and
the photodetector section for detecting the zero-order light ray and generating a detection signal when the polarization direction changes in the polarization converting section of the color separator.

11. The imager of claim 10, wherein the frame of the photodetector section and the focal length of the focusing section are defined such that a first- or higher-order diffracted light ray, which has gone out of the diffracting section of the color separator, is not focused by the focusing section onto the photodetector section.

12. The imager of claim 10, wherein the photodetector section includes a plurality of photosensing elements, which are arranged two-dimensionally.

13. An incoming ray color separating method comprising the steps of:
(a) converting an incoming light ray into a linearly polarized light ray such that the polarization direction of the linearly polarized light ray changes from one of predetermined directions into another at regular intervals; and
(b) diffracting the linearly polarized light ray, thereby producing a zero-order light ray in which one of multiple different wavelength components is selectively weakened according to the polarization direction at least.

14. The method of claim 13, wherein the step (a) includes the step of changing the polarization directions of the linearly polarized light ray from one of 0 degrees, 45 degrees and 90 degrees into another at the regular intervals.

15. The method of claim 13, wherein the step (b) includes the step of producing zero-order light rays in which red, blue and green wavelength components are selectively weakened according to the polarization direction of 0 degrees, 45 degrees and 90 degrees, respectively.

16. A video capturing method comprising the steps of:
(a) converting an incoming light ray into a linearly polarized light ray such that the polarization direction of the linearly polarized light ray changes from one of predetermined directions into another at regular intervals;
(b) diffracting the linearly polarized light ray, thereby producing a zero-order light ray in which one of multiple different wavelength components is selectively weakened according to the polarization direction at least; and
(c) detecting the zero-order light ray two-dimensionally at the intervals at which the directions change in the step (a).

17. The method of claim 16, wherein the step (a) includes the step of changing the polarization directions of the linearly polarized light ray from one of 0 degrees, 45 degrees and 90 degrees into another at the regular intervals.

18. The method of claim 17, wherein the step (b) includes the step of producing zero-order light rays in which red, blue and green wavelength components are selectively weakened according to the polarization direction of 0 degrees, 45 degrees and 90 degrees, respectively.

* * * * *